(12) United States Patent
Park et al.

(10) Patent No.: US 6,692,873 B1
(45) Date of Patent: Feb. 17, 2004

(54) COMPOSITION FOR FORMING ELECTRODE ACTIVE MATERIAL OF LITHIUM SECONDARY BATTERY, COMPOSITION FOR FORMING SEPARATOR AND METHOD OF PREPARING LITHIUM SECONDARY BATTERY USING THE COMPOSITIONS

(75) Inventors: Chi-kyun Park, Flanders, NJ (US); Archana Kakirde, Lake Hiawatha, NJ (US); Peikang Liu, Mt. Olive, NJ (US); Venkatesan Manivannan, Parsippany, NJ (US); Chul Chai, Saddle River, NJ (US); Dong-joon Ihm, Chonan (KR); Jon-ha Lee, Chonan (KR); Kwon-sun Roh, Chonan (KR)

(73) Assignee: SKC Co., Ltd., Kyungki-do (KR)

( * ) Notice: Subject to any disclaimer, the term of this patent is extended or adjusted under 35 U.S.C. 154(b) by 153 days.

(21) Appl. No.: 09/629,951

(22) Filed: Aug. 1, 2000

(30) Foreign Application Priority Data

Aug. 5, 1999 (KR) ........................................ 1999-32142
Oct. 28, 1999 (KR) ........................................ 1999-47119

(51) Int. Cl.[7] ................................................. H01M 2/16
(52) U.S. Cl. ........................ 429/247; 429/249; 429/129; 29/623.5
(58) Field of Search ................................. 429/247, 249, 429/129; 29/623.1, 623.5; 252/62.2, 182.1

(56) References Cited

U.S. PATENT DOCUMENTS

| | | | |
|---|---|---|---|
| 5,266,422 A | * 11/1993 | Reush et al. | 429/192 |
| 5,418,091 A | * 5/1995 | Gozdz et al. | 429/252 |
| 5,478,676 A | * 12/1995 | Turi et al. | 429/234 |
| 5,540,741 A | * 7/1996 | Gozdz et al. | 29/623.5 |
| 5,720,780 A | * 2/1998 | Liu et al. | 29/623.1 |
| 6,063,899 A | * 5/2000 | Johnson et al. | 528/482 |
| 6,342,320 B2 | * 1/2002 | Liu et al. | 429/307 |

OTHER PUBLICATIONS

The Dow Chemical Co. Product Guide (http://www.dow.com/glycolether/lat/p2.htm), 1995.*
Table from the Propylene Glycol Ethers Panel (http://www.pgep.org/commonnames.htm), Jul. 2000.*

* cited by examiner

Primary Examiner—Patrick Ryan
Assistant Examiner—Julian Mercado
(74) Attorney, Agent, or Firm—Nixon & Vanderhye PC (57) ABSTRACT

An electrode active material forming composition, a separator forming composition and a manufacturing method of a lithium secondary battery using the compositions are provided. The method for manufacturing a lithium secondary battery including the steps of (a) coating electrode active material compositions each comprising a electrode active material, a binder and a solvent on an electrode current collector to form a cathode and an anode, (b) forming a separator on both surfaces of the anode using a composition for forming a separator comprising a polymer resin, a plasticizer, a filler and a solvent; (c) disposing and fixedly adhering the cathode on the separator to form a battery structure, (d) drying the battery structure under a vacuum condition, and (e) impregnating an electrolytic solution into the resultant structure, wherein the plasticizer of the composition for forming the separator is at least one material selected from the group consisting of an ethylene glycol derivative, a cyclic carbonate, a non-cyclic carbonate and propylene glycol carbonate. Therefore, since a plasticizer can be removed under a vacuum condition, the time required for manufacturing a battery can be reduced and the manufacturing process becomes simplified, thereby improving the productivity. Also, since an organic solvent extraction process using an organic solvent is not necessary, unlike in the conventional art, the cost required for a recovery facility of an organic solvent can be reduced. Further, uniform pores are formed in electrodes and a separator, the porosity characteristics are excellent, and adhesion between the separator and the electrodes is excellent, thereby exhibiting excellent high-rate, lifetime, and low-temperature characteristics.

9 Claims, 8 Drawing Sheets

COMPOSITION FOR FORMING ELECTRODE ACTIVE MATERIAL OF LITHIUM SECONDARY BATTERY, COMPOSITION FOR FORMING SEPARATOR AND METHOD OF PREPARING LITHIUM SECONDARY BATTERY USING THE COMPOSITIONS

BACKGROUND OF THE INVENTION

1. Field of the Invention

The present invention relates to a composition for forming an electrode active material of a lithium secondary battery, a composition for forming a separator and a method of preparing a lithium secondary battery using the compositions, and more particularly, a composition for forming an electrode active material of a simplified lithium secondary battery without a step of extracting a plasticizer using an organic solvent, a composition for forming a separator and a method of preparing a lithium secondary battery using the compositions.

2. Description of the Related Art

According to the kind of electrolyte used, lithium secondary batteries are classified into lithium ion batteries using liquid electrolyte and lithium ion polymer battery using polymer solid electrolyte.

Among lithium secondary batteries, lithium ion batteries have been successfully commercialized by Sony Corp. in 1991. Also, consistent attempts to commercialization of lithium ion polymer batteries have been made since they were developed by Bell Communications Research Inc. in 1995. Lithium ion polymer batteries which are in widespread use, polyvinylidenefluoride resin that absorbs a nonaqueous electrolytic solution to have excellent ionic conductivity, is used as solid electrolyte.

In manufacturing a lithium ion polymer battery, during formation of an electrode and polymer electrolyte, poor interlayer adhesion between the electrode and polymer electrolyte increases internal resistance of the battery, thereby considerably degrading the performance of battery. Thus, in order to improve the characteristics of a lithium ion polymer battery, it is essential to improve the interlayer adhesion between an electrode and polymer electrolyte.

In order to enhance the interlayer adhesion between an electrode and polymer electrolyte, Bell Communications Research, Inc. has proposed a method in which an electrode binder, vinylidenefluoride (VdF)-hexafluoropropylene (HFP) copolymer as a polymer resin of solid electrolyte, wherein the unit of HFP is 8 to 25%, was used, and a separately fabricated electrode and solid polymer electrolyte were thermally laminated at a temperature of 100° C. or higher to be adhered to each other (U.S. Pat. Nos. 5,460,904, 5,540,741 and 5,607,485). As a plasticizer for forming pores in the electrode and the polymer electrolyte, dibutyl phthalate (DBP) was used. DBP is generally removed by being repeatedly extracted using an organic solvent such as ether or methanol.

However, removal of a plasticizer by extraction using an organic solvent requires much time, thereby lowering the manufacturing efficiency of batteries. Also, a solvent used in extracting a plasticizer and an equipment for extracting the plasticizer increase the manufacturing cost. Further, a system for recovering the solvent used for plasticizer extraction is necessary.

SUMMARY OF THE INVENTION

To solve the above problems, it is a first object of the present invention to provide a composition for forming an electrode active material of a lithium secondary battery which does not require a plasticizer extraction process using an organic solvent.

It is a second object of the present invention to provide a composition for forming a separator of a lithium secondary battery which does not require a plasticizer extraction process using an organic solvent.

It is a third object of the present invention to provide a method of preparing a simplified lithium secondary battery which can reduce the manufacturing cost and time, and which has excellent lifetime characteristic, high performance and low temperature characteristic.

To achieve the first object of the present invention, there is provided a composition for forming an electrode active material of a lithium secondary battery, having an electrode active material, a plasticizer, a binder and a solvent, wherein the plasticizer is at least one material selected from the group consisting of an ethylene glycol derivative, a cyclic carbonate, a non-cyclic carbonate and propylene glycol carbonate.

The composition may further include a conductive agent. Also, it is preferable that the ethylene glycol derivative is at least one material selected from the group consisting of ethylene glycol diacetate, ethylene glycol dibutyrate, ethylene glycol dibutylether and ethylene glycol dipropionate; the cyclic carbonate is at least one material selected from the group consisting of ethylene carbonate and propylene carbonate; the noncyclic carbonate has a boiling point of 70 to 130° C. and is at least one material selected from the group consisting of diethyl carbonate, dimethyl carbonate and ethylmethyl carbonate; and the propylene glycol derivative has a boiling point of 120 to 160° C. and is at least one material selected from the group consisting of propylene glycol methyl ether acetate, propylene glycol monomethylether and propylene glycol monoethyl ether.

To achieve the second object of the present invention, there is provided a composition for forming a separator of a lithium secondary battery, having a polymer resin, a plasticizer, a filler and a solvent, wherein the plasticizer is at least one material selected from the group consisting of an ethylene glycol derivative, a cyclic carbonate, a non-cyclic carbonate and propylene glycol carbonate.

Preferably, the polymer resin is polyvinylidenefluoride (PVdF), vinylidenefluoride-hexafluoropropylene copolymer in which the content of HFP is greater than 0 and less than 8% by weight (VdF-HFP copolymer A), a mixture of VdF-HFP copolymer A and PVdF, or a mixture of VdF-HFP copolymer A and VdF-HFP copolymer in which the content of HFP is greater than 0 and less than or equal to 15% by weight (VdF-HFP copolymer B).

To achieve the third object of the present invention, there is provided a method for manufacturing a lithium secondary battery including the steps of (a) coating electrode active material compositions each comprising a electrode active material, a binder and a solvent on an electrode current collector to form a cathode and an anode, (b) forming a separator on both surfaces of the anode using a composition for forming a separator comprising a polymer resin, a plasticizer, a filler and a solvent; (c) disposing and fixedly adhering the cathode on the separator to form a battery structure, (d) drying the battery structure under a vacuum condition, and (e) impregnating an electrolytic solution into the resultant structure, wherein the plasticizer of the composition for forming the separator is at least one material selected from the group consisting of an ethylene glycol derivative, a cyclic carbonate, a non-cyclic carbonate and propylene glycol carbonate.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

In the present invention, at least one selected from the group consisting of ethylene glycol derivative, a cyclic carbonate, noncyclic carbonate and a propylene glycol derivative, is used as plasticizers of a composition for forming an electrode active material and/or a composition for forming a separator, and the plasticizers are removed by evaporating the same under a vacuum condition. In the case where the plasticizer used is an ethylene glycol derivative or a cyclic carbonate, preferable conditions of a plasticizer extraction process are 20 to $10^{-3}$ torr in pressure and 40 to 130° C. in temperature. Here, examples of the ethylene glycol derivative include ethylene glycol diacetate (boiling point: 190.5° C.), ethylene glycol dibutyrate (boiling point: 240° C.), ethylene glycol dibutylether (boiling point: 203.1° C.), and ethylene glycol dipropionate (boiling point: 211° C.). In the case where the plasticizer used is a noncyclic carbonate and a propylene glycol derivative, boiling points thereof being in the range of 70 to 130° C., the plasticizer is preferably removed by an extraction process at 20 to 60° C. in temperature and 760 to $10^{-3}$ torr in pressure under a vacuum condition. Examples of the noncyclic carbonate which is a plasticizer removable under such conditions include diethyl carbonate, dimethyl carbonate and ethylmethyl carbonate. Examples of the propylene glycol derivative include propylene glycol methyl ether acetate, propylene glycol monomethylether and propylene glycol monoethyl ether. Specifically, the plasticizer is preferably a material having a flash point of 60° C. or below. The plasticizers that satisfy the above conditions are propylene glycol methylethylacetate having a boiling point of 146.1° C. and a flash point of 45.6° C. and diethyl carbonate having a boiling point of 127° C. and a flash point of 31° C. If the boiling point of a plasticizer is beyond 130° C. or the flash point of a plasticizer is beyond 60° C., it is difficult to remove the plasticizer at a 20 to 60° C. vacuum condition. Thus, in order to increase the removal efficiency, the drying temperature must be increased to 60° C. or higher and the extent of vacuum must be increased.

Also, more preferably, the plasticizer of the present invention has a property of not dissolving or partially dissolving the binder of a composition for forming an electrode active material and a polymer resin of a composition for forming a separator. Here, the partial solubility for the polymer can be expressed as a percent swelling value, which is obtained as follows.

A film of a polyvinylidenefluoride or vinylidenefluoride-hexapropylene copolymer is impregnated in a plasticizer at room temperature for a predetermined time. Then, the weight of the polymer film having the plasticizer impregnated therein is measured, and the ratio of the measured value to the weight of a polymer film before impregnating the same in the plasticizer is a percent swelling value.

For example, when a 94:8 VdF-HFP copolymer film is impregnated in propylene glycol methyletheracetate (PGMEA) for about 30 days, the percent swelling value of PGMEA at room temperature is 55% or less. When a polyvinylidenefluoride film is impregnated in PGMEA for about 30 days, the percent swelling value of PGMEA at room temperature is 14% or less.

Now, a composition for forming an electrode active material according to the present invention and a method of manufacturing an electrode using the same will be described.

The composition for forming an electrode active material according to the present invention consists of an electrode active material, a plasticizer, a binder and a solvent. Here, the binder is not specifically restricted and any material having a relatively low solubility to an electrolytic solution at a temperature of about 60° C. Usable materials as the binder include polyvinylidenefluoride (PVdF), VdF-HFP copolymer A in which 0 to 8 wt % HFP is contained, a mixture of VdF-HFP copolymer A and PVdF, and a mixture of VdF-HFP copolymer A and VdF-HFP copolymer B in which 0 to 15 wt % HFP is contained. In particular, the binder is more preferably PVDF, a VdF-HFP copolyer A or a mixture thereof. This is because, if the content of HFP contained in a VdF-HFP copolymer is out of the content range, the copolymer is partially dissolved in the electrolytic solution at 60° C., which may cause rather deterioration in the battery characteristics.

VdF-HFP copolymer A and PVdF is preferably mixed at a ratio of 99.99:0.01 to 50:50 by weight, and VdF-HFP copolymer A and VdF-HFP copolymer B is preferably mixed at a ratio of 99.99:0.01 to 30:70 by weight. If the content of VdF-HFP copolymer A with respect to VdF-HFP copolymer B or PVdF is beyond the above range, the performance enhancing effect at a high temperature of approximately 60° C. is undesirably negligible. Here, the content of the binder is 1 to 15 parts by weight. If the content of the binder is less than 1 part by weight, the bonding force between components in the electrode active material becomes weak. If the content of the binder is greater than 15 parts by weight, the content of the electrode active material relative to that of the binder is undesirably reduced.

Usable examples of the solvent include N-methylpyrrolidone (NMP), dimethylformamide (DMF), a ketone-based solvent, a mixture thereof and the like, which are capable of dissolving components of the composition for forming an electrode active material, and the content thereof is 30 to 400 parts by weight based on the weight of 100 parts by weight of solid content. If the content of the solvent is less than 30 parts by weight, the components contained in the composition for forming the electrode active material are not completely dissolved. If the content of the solvent is greater than 400 parts by weight, coating of the composition is quite difficult. Here, examples of the ketone-based solvent include acetone, cyclohexanone, cyclopentanone and the like. In the composition for forming an electrode active material, as a plasticizer, an ethylene glycol derivative, a cyclic carbonate, noncyclic carbonate having a boiling point of 70 to 130° C. and a propylene glycol derivative having a boiling point of 120 to 160° C., is used, and the content thereof is 1 to 400 parts by weight. If the content of the plasticizer is less than 1 part by weight, the effect owning to addition of the plasticizer is negligible. If the content of the plasticizer is greater than 400 parts by weight, the content of the electrode active material relative to that of the plasticizer is undesirably reduced.

Lithium complex oxide such as $LiCoO_2$ is used as the cathode active material of the present invention, and the content thereof is 60 to 96 parts by weight. Here, if the content of the electrode active material is beyond the above range, the discharge capacity characteristics are undesirably deteriorated. Also, carbon black is used as a conductive agent. Here, in the case of adding the conductive agent to the composition for forming an electrode active material, the content of the conductive agent is preferably 1 to 10 parts by weight. If the content of the conductive agent is less than 1 part by weight, the conductivity of the electrode is lowered. If the content of the conductive agent is greater than 10 parts by weight, the content of the electrode active material relative to that of the conductive agent is undesirably reduced.

A process of preparing an electrode using the composition for forming an electrode active material will now be described.

The above-described electrode active material composition is directly coated on an electrode current collector and dried. Otherwise, the electrode active material composition is cast on a separately prepared support and dried. Then, a product peeled off from the support is laminated on the electrode current collector, thereby forming a cathode and an anode.

Here, a polyethylterephthalate film or a mylar film is used as the support.

Aluminum expended metal, aluminum punched metal, an aluminum foil or an aluminum mesh is used as a cathode current collector. A copper expended metal, copper punched metal, a copper foil or a copper mesh is used as an anode current collector.

A composition for forming a separator of the present invention and a method of manufacturing the separator using the composition will now be described.

The composition for forming a separator consists of a polymer resin, a filler, a solvent and a plasticizer. Here, usable polymer resins are the same as materials for the binder of the composition for forming the electrode active material, and the content thereof is 4 to 50 parts by weight. If the content of the polymer resin is beyond the above range, the physical properties of the separator are deteriorated. The life performance of a battery can be enhanced by using the electrode binder which is the same material as that of the separator. Also, the plasticizer is made of the same material as that of the composition for forming an electrode active material, and the content thereof is 20 to 400 parts by weight. If the content of the plasticizer is less than 20 parts by weight, the effect owning to addition of the plasticizer is negligible. If the content of the plasticizer is greater than 400 parts by weight, the content of the electrode active material relative to that of the plasticizer is undesirably reduced.

The filler serves to increase the mechanical strength of the separator and examples thereof include silica, kaolin, synthetic zeolite or the like. Here, the content of the plasticizer is preferably 1 to 100 parts by weight. If the content of the filler is less than 1 part by weight, the mechanical strength of the separator becomes weak. If the content of the filler is greater than 100 parts by weight, it is quite difficult to form the separator into a film.

The solvent is a material capable of dissolving components of a composition for forming the separator and any material that is used in manufacturing an electrode active material composition can be used. Specifically, acetone having a boiling point of 160° C. or below is preferably used in view of porosity of the separator. The content of the solvent is 20 to 900 parts by weight. If the content of the solvent is less than 20 parts by weight, the components contained in the composition for forming the separator are not completely dissolved. If the content of the solvent is greater than 900 parts by weight, coating of the composition is quite difficult.

A method for manufacturing a separator using the composition for forming a separator will now be described.

First, acetone is added to a mixture of a polymer resin, a filler and a plasticizer and mixed to prepare a composition for forming a separator. A separator layer is formed on a base to be coated with the composition. Here, the separator layer is formed by directly coating the composition for forming a separator on the base and drying the resultant structure or by casting the composition for forming the separator on a separate support, drying the resultant structure and peeling off a layer from the support.

Next, a method for manufacturing a lithium secondary battery according to the present invention will be described.

First, an electrode active material forming composition containing an electrode active material, a binder and a solvent is coated on an electrode current collector, thereby forming a cathode and an anode. Then, the cathode and the anode are cut into a predetermined size.

The electrode active material forming composition may further include a conductive agent and/or a plasticizer. Here, usable plasticizers include an ethylene glycol derivative, a cyclic carbonate, a noncyclic carbonate, boiling points thereof being in the range of 70 to 130° C., a propylene glycol derivative, a boiling point thereof being in the range of 120 to 160° C., or a mixture thereof.

However, in the present invention, the plasticizer is not necessarily added in manufacturing an electrode, which is advantageous in view of the energy density of a battery due to an increase in the relative content ratio of an electrode active material.

Separately from the process for manufacturing an electrode, a separator is formed on both surfaces of the anode using a composition for forming a separator containing a polymer resin, a plasticizer, a filler and a solvent. Here, the separator can be formed by directly coating the composition for forming a separator on both surfaces of the anode and drying the resultant structure, or by casting the composition for forming a separator on a separate support, drying and peeling off a layer from the support.

The thus obtained separator is wound in a rolled state for storage. Even if the separator of the present invention is stored in the air after winding the same in a rolled state, it exhibits little change in the composition.

The cathode that is cut into an appropriate size is disposed on the separator and fixedly adhered, and then heat and pressure are applied thereto, thereby forming a battery structure having incorporated electrode and separator.

Thereafter, the resultant structure is dried at a vacuum condition to remove the solvent and the plasticizer in the battery. Here, in the case where the plasticizer used is an ethylene glycol derivative or a cyclic carbonate, preferable conditions of the plasticizer removal process are 20 to $10^{-3}$ torr in pressure and 40 to 130° C. in temperature. Here, if the temperature during the vacuum drying step is lower than 40° C., it is difficult to completely remove the plasticizer. If the temperature is higher than 130° C., organic materials such as the binder contained in the electrode active material may be undesirably deformed. Also, in the case where the plasticizer used is a noncyclic carbonate and a propylene glycol derivative, boiling points thereof being in the range of 70 to 130° C., the plasticizer is preferably removed by an extraction process at 20 to 60° C. in temperature and 760 to $10^{-3}$ torr in pressure under a vacuum condition. Here, if the temperature during the vacuum drying step is lower than 20° C., it is difficult to completely remove the plasticizer. If the temperature is higher than 60° C., the life performance of a battery may be deteriorated.

Next, an electrolytic solution is injected into the resultant structure, thereby completing a lithium secondary battery.

Here, the electrolytic solution consists of an organic solvent and a lithium salt. The organic solvent is at least one selected from the group consisting of propylene carbonate (PC), ethylene carbonate (EC), γ-butyrolactone, 1,3-dioxolane, dimethoxyethane, dimethylcarbonate (DMC), diethylcarbonate (DEC), methylethylcarbonate (MEC), tetrahydrofuran (THF), dimethylsulfoxide and polyethylene glycol dimethylether. The amount of the solvent is the same as that used in conventional lithium secondary batteries.

The lithium salt is not specifically restricted and a lithium compound which is dissociated from the organic solvent to produce lithium ions can be used. Examples of specific lithium salts include at least one ionic lithium salt selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethansulfonyl amide (LiN($CF_3SO_2$)$_2$). The amount of the lithium salt is the same as that used in conventional lithium secondary batteries. When the organic electrolytic solution containing such an inorganic salt is injected into the electrode structure, it serves as a path along which lithium ions move in the direction of current.

In the present invention, when manufacturing an electrode structure by laminating an anode, a cathode and a separator, a direct coating method is preferably used, rather than a conventional lamination method. This is because, if the conventional thermal lamination method is used, such a component as ethylene glycol diacetate used as a plasticizer, having a considerably low boiling point, may be partially evaporated, resulting in deformation in the composition and shape of the battery.

The present invention will now be described through the following examples and is not limited thereto.

EXAMPLE 1

6.4 g of a VdF:HFP copolymer (Kynar Flex 2801) was mixed with 34.3 g of acetone, 17.1 g of cyclohexanone and 11.6 g of ethylene glycol diacetate. To the mixture were added 0.6 g of acetylene black (Chevron Chemical Company) and 30.0 g of mesophase microbeads (MCMB) 25–28 (Osaka Gas Co., Ltd.) and sufficiently mixed to prepare an anode active material slurry. The anode active material slurry was coated on both surfaces of a copper mesh using a die coater, dried and pressed to prepare a 280-μm-thick anode.

5.14 g of a VdF:HFP copolymer (Kynar Flex 2801) was mixed with 34.9 g of acetone, 15.4 g of cyclohexanone and 7.7 g of ethylene glycol diacetate. To the mixture were added 2.6 g of acetylene black (Chevron Chemical Company) and 33.3 g of $LiCoO_2$ (Seimi Chemical Co., Ltd.) and sufficiently mixed to prepare a cathode active material slurry.

The cathode active material slurry was coated on both surface of an aluminum mesh using a die coater, dried and pressed to prepare a 150 μm thick cathode.

6.8 g of a VdF:HFP copolymer (Kynar Flex 2801) was mixed with 47.6 g of acetone, 20.4 g of cyclohexanone and 11.6 g of polyethylene glycol dimethylether (Aldrich Chemical Company). To the mixture was added 13.6 g of a molecular sieve (Aldrich Chemical Company) having a particle diameter of 5 μm and sufficiently mixed to prepare a slurry for forming a separator.

The separator forming slurry was coated on both surfaces of the anode using a die coater, dried and pressed to prepare a 60-μm-thick separator. The separator forming slurry was further coated on both surfaces of the separator using a die coater and then the cathode was closely mounted thereon so that the distance between cathodes was less than or equal to 5 mm, and then dried. Subsequently, the obtained electrode plate was cut into a predetermined size to prepare a bicell.

Subsequently, polyethylene glycol dimethylether was completely removed from the bicell and then dried under a vacuum condition of approximately 65° C. and $10^{-1}$ torr.

Thereafter, the obtained cell was dried in a vacuum state at 50° C. for 1 hour, and then put into a plastic case which can be sealed by heat. Then, an electrolytic solution (1M $LiPF_6$ in a mixture of EC:DMC:DEC in a ratio of 1:1:1) was injected into the resultant structure under an argon gas atmosphere, thereby completing a lithium secondary battery.

EXAMPLE 2

A lithium secondary battery was prepared by the same procedure as in Example 1 except that silica was used instead of a molecular sieve in preparing a composition for forming a separator.

EXAMPLE 3

A lithium secondary battery was prepared by the same procedure as in Example 1 except that the particle diameter of a molecular sieve was 20 μm.

EXAMPLE 4

A lithium secondary battery was prepared by the same procedure as in Example 1 except that a thermal lamination method was used in manufacturing an electrode structure by stacking a cathode, an anode and a separator.

EXAMPLE 5

6.2 g of a 94:6 VdF:HFP copolymer (Solvay 20615) was mixed with 75 g of NMP. To the mixture was added 93.8 g of mesophase microbeads (MCMB) 25–28 (Osaka Gas Co., Ltd.) and sufficiently mixed to prepare an anode active material slurry.

The anode active material slurry was coated on a copper foil using a die coater, dried and pressed to prepare a 190-μm-thick anode.

4.5 g of a 94:6 VdF:HFP copolymer (Solvay 20615) was mixed with 75 g of NMP. To the mixture was added 2 g of acetylene black (Chevron Chemical Company) and 93.5 g of $LiCoO_2$ (Seimi Chemical Co., Ltd.) and sufficiently mixed to prepare a cathode active material slurry.

The cathode active material slurry was coated on both surface of an aluminum expanded metal using a die coater, dried and pressed to prepare a 150 μm thick cathode.

4.5 g of a 94:6 VdF:HFP copolymer (Solvay 20615) was mixed with 1.5 g of silica (Aldrich Chemical Company), 22.6 g of diethylcarbonate (Mitsubishi Chemical Company) and 71.4 g of acetone (Aldrich Chemical Company) to prepare a slurry for forming a separator.

The separator forming slurry was coated on a PET film and was then dried by letting alone at room temperature for about 40 minutes, to fabricate a separator film. Then, the separator film and the PET film were peeled apart, and then pre-lamination was performed on both surfaces of the anode. Subsequently, the cathode was placed on both surfaces of the pre-laminated anode and then lamination was performed to form an electrode structure.

The resultant structure was dried at a vacuum condition of 40° C. and $10^{-2}$ torr to obtain a cell.

Thereafter, the obtained cell was dried in a vacuum state at 50° C. for 1 hour, and then put into a plastic case which can be sealed by heat. Then an electrolytic solution (1M $LiPF_6$ in a mixture of EC:DMC:DEC in a ratio of 1:1:1) was injected into the resultant structure under an argon gas atmosphere, thereby completing a lithium secondary battery.

EXAMPLE 6

A lithium secondary battery was prepared by the same procedure as in Example 5 except that a mixture of 15.0 g of diethylcarbonate (Mitsubishi Chemical Company) and 7.6 g of propylene glycol methyl ether acetate was used instead of 22.6 g of diethylcarbonate in preparing a composition for forming a separator.

EXAMPLE 7

A lithium secondary battery was prepared by the same procedure as in Example 5 except that a mixture of 7.6 g of diethylcarbonate and 15.0 g of propylene glycol methyl ether acetate was used instead of 22.6 g of diethylcarbonate in preparing a composition for forming a separator.

EXAMPLE 8

A lithium secondary battery was prepared by the same procedure as in Example 5 except that 22.6 g of propylene glycol methyl ether acetate was used instead of 22.6 g of diethylcarbonate in preparing a composition for forming a separator.

EXAMPLE 9

A lithium secondary battery was prepared by the same procedure as in Example 5 except that a mixture of 15.0 g of diethylcarbonate and 7.6 g of cyclohexanone was used instead of 22.6 g of diethylcarbonate in preparing a composition for forming a separator.

EXAMPLE 10

A lithium secondary battery was prepared by the same procedure as in Example 5 except that a mixture of 15.0 g of diethylcarbonate and 7.6 g of NMP was used instead of 22.6 g of diethylcarbonate in preparing a composition for forming a separator.

COMPARATIVE EXAMPLE 1

A lithium secondary battery was prepared by the same procedure as in Example 1 except that dibutyl phthalate (DBP) was used as a plasticizer instead of ethylene glycol diacetate and methanol was used as a plasticizer removing solvent.

COMPARATIVE EXAMPLE 2

A lithium secondary battery was prepared by the same procedure as in Comparative Example 1 except that polyethylene glycol dimethylether was used as a plasticizer instead of DBP.

COMPARATIVE EXAMPLE 3

A lithium secondary battery was prepared by the same procedure as in Comparative Example 1 except that silica was used instead of a molecular sieve in preparing a composition for forming a separator.

COMPARATIVE EXAMPLE 4

2.0 g of a 88:12 VdF:HFP copolymer (Kynar Flex 2801) (Elf Atochem) was mixed with 12 g of acetone and 3.12 g of DBP. To the mixture were added 0.37 g of acetylene black (Chevron Chemical Company) and 7.0 g of mesophase microbeads (MCMB) 25–28 (Osaka Gas Co., Ltd.) and sufficiently mixed to prepare an anode active material slurry.

The anode active material slurry was coated on both surfaces of a copper foil using a die coater, dried and pressed to prepare a 190-μm-thick anode.

2.8 g of a 88:12 VdF:HFP copolymer (Kynar Flex 2801) was mixed with 20 g of acetone and 43 g of DBP. To the mixture were added 1.125 g of acetylene black (Chevron Chemical Company) and 10.5 g of $LiCoO_2$ (Seimi Chemical Co., Ltd.) and sufficiently mixed to prepare a cathode active material slurry.

The cathode active material slurry was coated on both surfaces of an aluminum expanded metal using a die coater, dried and pressed to prepare a 150-μm-thick cathode.

2.0 g of a 88:12 VdF:HFP copolymer (Kynar Flex 2801) was mixed with 1.5 g of silica (Aldrich Chemical Company), 2.0 g of DBP and 10 g of acetone (Aldrich Chemical Company) were mixed to prepare a slurry for forming a separator.

The separator forming slurry was coated on a PET film and was then dried by leaving it in a room temperature environment for about 40 minutes, to fabricate a separator film. Then, the separator film and the PET film were peeled apart, and then pre-lamination was performed on both surfaces of the anode. Subsequently, the cathode was placed on both surfaces of the pre-laminated anode and then lamination was performed to form an electrode structure.

The resultant electrode structure was impregnated in methanol and DBP was extracted and removed therefrom to obtain a cell.

Thereafter, the obtained cell was dried in a vacuum state at 50° C. for 1 hour, and then put into a plastic case which can be sealed by heat. Then, an electrolytic solution (1M $LiPF_6$ in a mixture of EC:DMC:DEC in a ratio of 1:1:1) was injected into the resultant structure under an argon gas atmosphere, thereby completing a lithium secondary battery.

Figure 1:
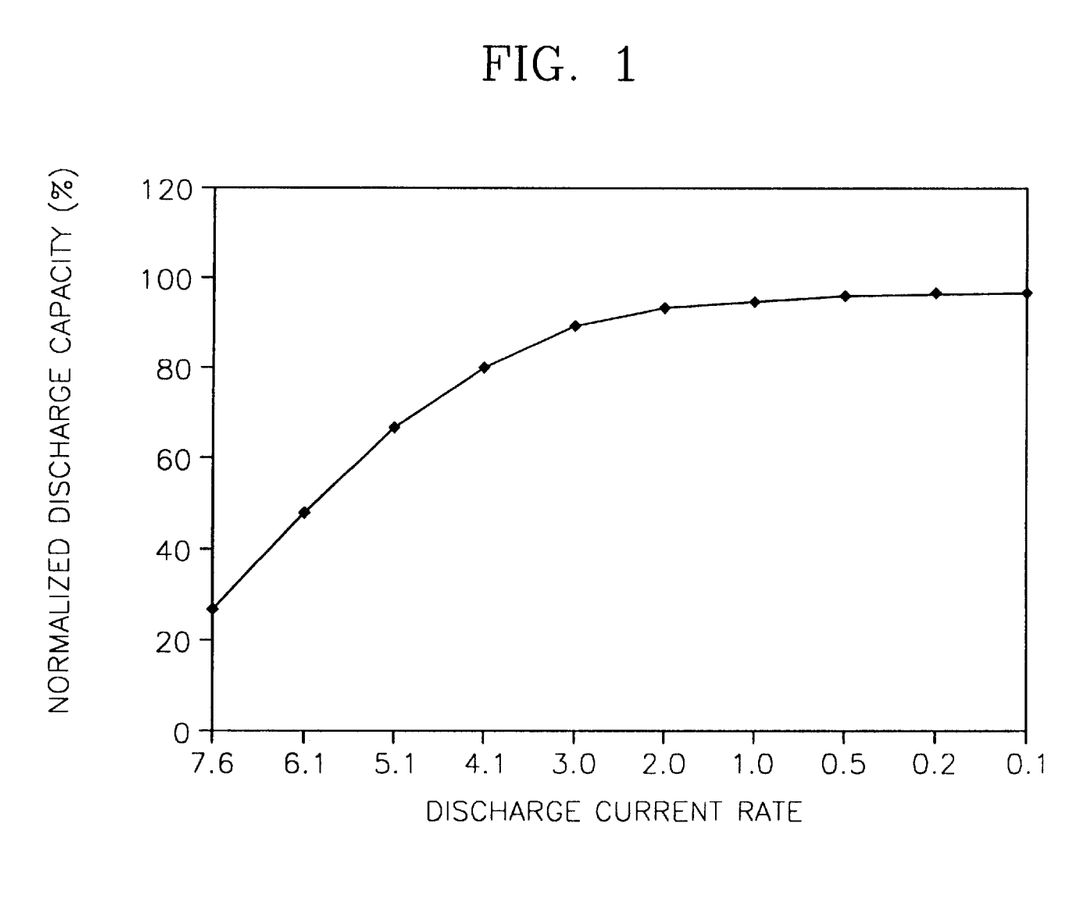
FIG. 1 illustrates high current discharge characteristics of a lithium secondary battery prepared by Example 1 of the present invention.

High-current discharge characteristics of lithium secondary batteries prepared by Example 1 was examined and the result is shown in FIG. 1.

Referring to FIG. 1, it is confirmed that the lithium secondary battery prepared by Example 1 has excellent high-current discharge characteristics.

In Examples 1–10, a plasticizer extracting step using an organic solvent could be skipped, unlike in Comparative Examples 1–4. Thus, the time required for manufacturing batteries can be reduced and the manufacturing process can be simplified.

Also, when ethylene glycol diacetate was used as a plasticizer like in Example 1, and an electrode and polymer electrolyte were stacked by a thermal lamination method like in Example 4, ethylene glycol diacetate was partially evaporated during thermal lamination. Thus, it was difficult to obtain a battery having a desired composition.

Figure 2:
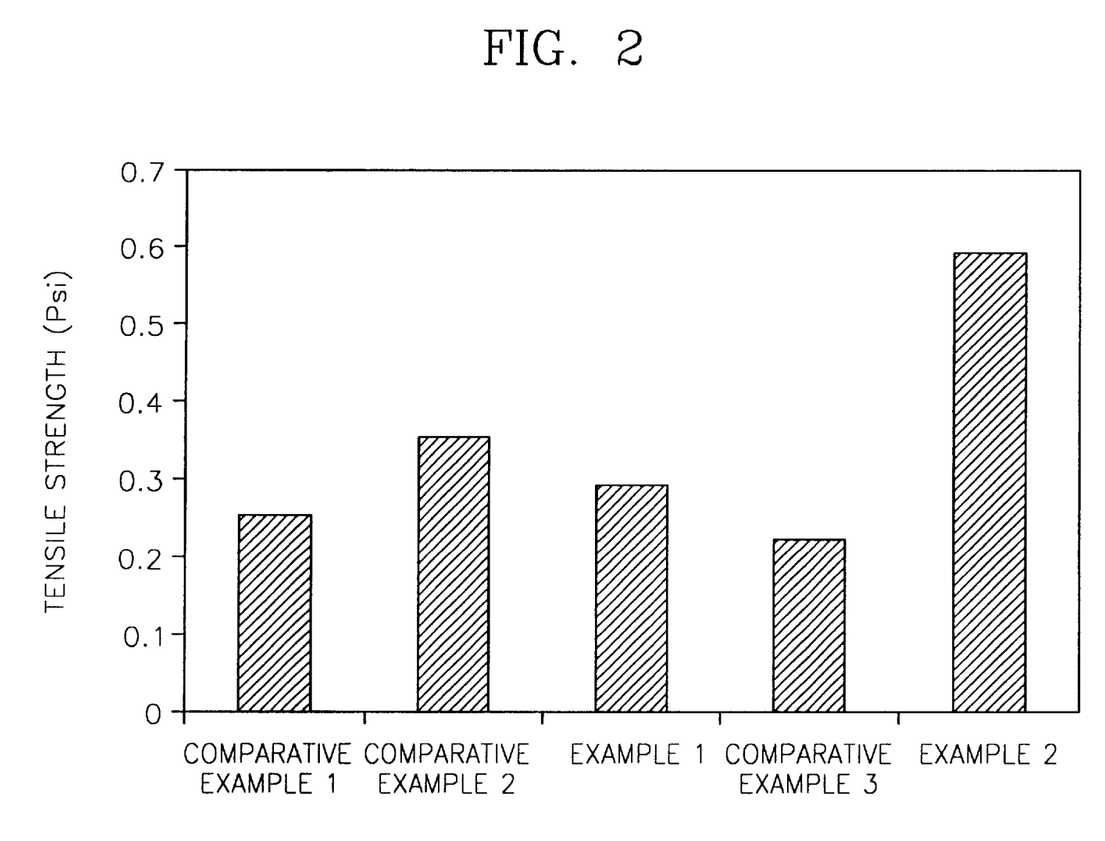
FIG. 2 illustrates tensile strength characteristics of separators prepared by Examples 1–2 of the present invention and Comparative Examples 1–3.

Tensile strengths of polymer electrolytes prepared by Examples 1–2 and Comparative Examples 1–3 were measured and the measurement results are shown in FIG. 2.

Referring to FIG. 2, it is confirmed that polymer electrolytes prepared by Examples 1 and 2 have excellent tensile strengths compared to those prepared by Comparative Examples 1 and 3. Also, the polymer electrolyte prepared by Comparative Example 2 has excellent tensile strength compared to that prepared by Example 2.

Figure 3:
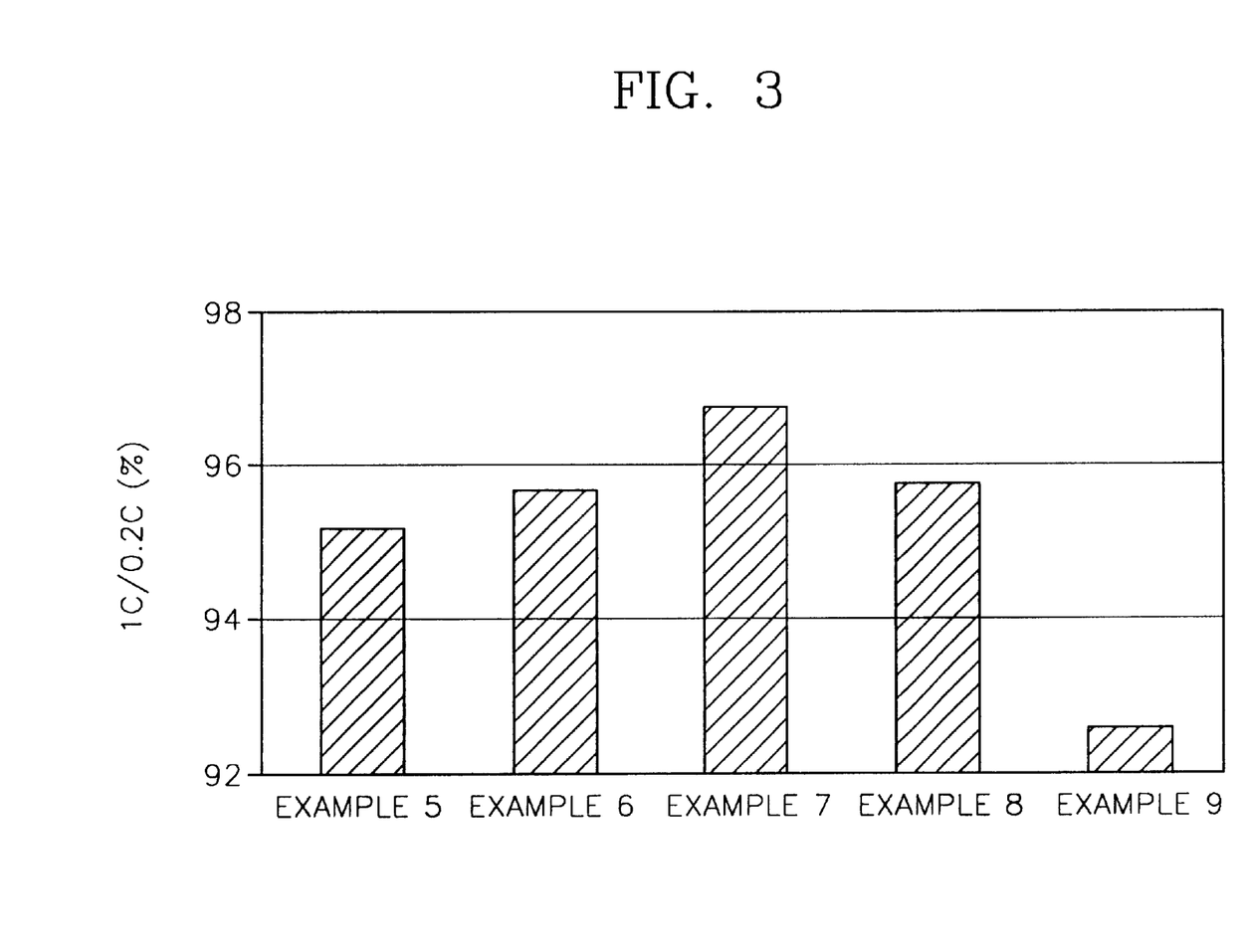
FIG. 3 illustrates high-rate characteristics of lithium secondary batteries prepared by Examples 5–9 of the present invention.

High-rate characteristics of lithium ion polymer secondary batteries prepared by Examples 5–9 were examined and the results are shown in FIG. 3. The method of measuring the high-rate characteristics of batteries will now be described.

First, a lithium secondary battery is charged with 1C and discharged with 0.2C to obtain a discharge capacity at 0.2 C, and is then charged with 1 C and discharged with 1 C to obtain a discharge capacity at 1 C. Percentile values of a 1 C discharge capacity with respect to a 0.2C discharge capacity are calculated.

Referring to FIG. 3, lithium secondary batteries prepared by Examples 5–8 have better high-rate characteristics than the lithium secondary battery prepared by Example 9, which will now be described.

In Example 9, cyclohexanone was used as a solvent. Such a solvent has a larger solubility of a separator in a VdF-HFP copolymer, that is, a percent swelling value, than that in the case of a plasticizer. Thus, even if cyclohexanone is removed during a vacuum-drying process, pores which have already been formed, may be reduced. This phenomenon can be confirmed not only by direct comparison of porosity but also by comparison of SEM photographs of separators prepared by Examples 7–8 and those by Examples 9–10.

Figure 4A:
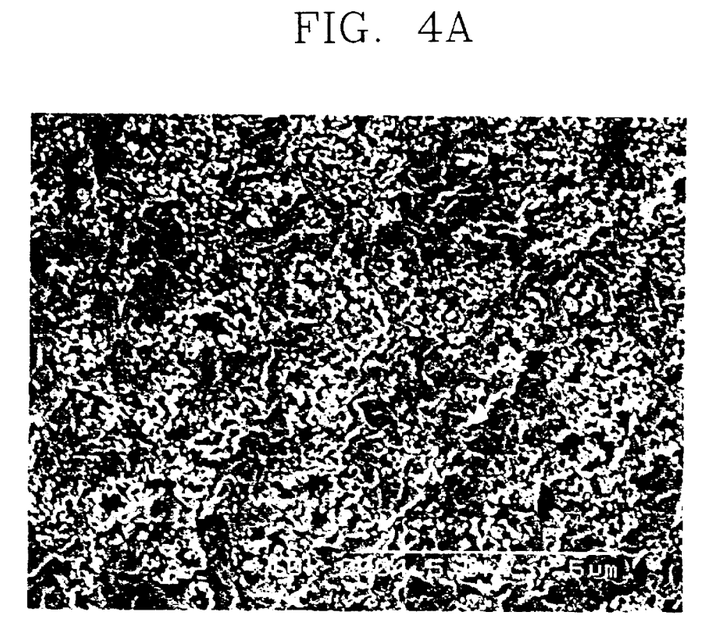
FIGS. 4A through 4D are SEM (Scanning Electron Microscopy) photographs of separators prepared by Examples 7–10 of the present invention.
Figure 4B:
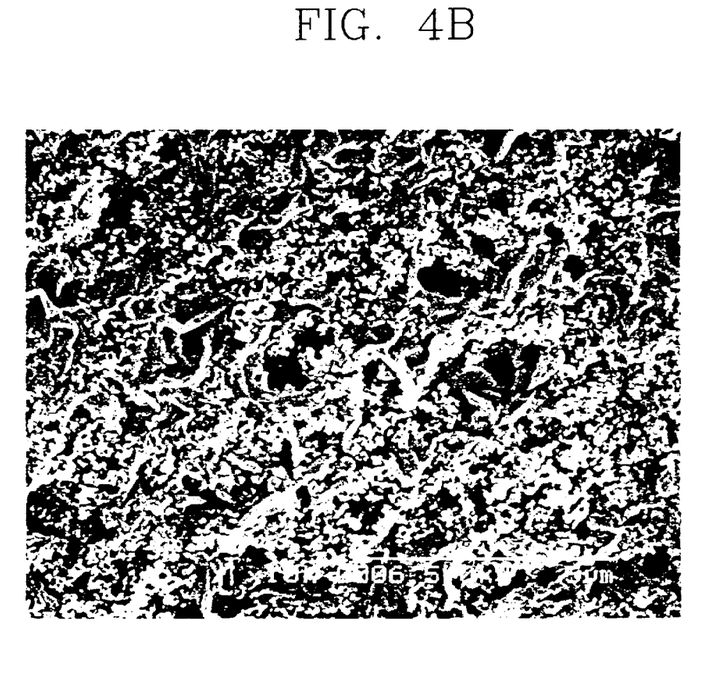
Figure 4C:
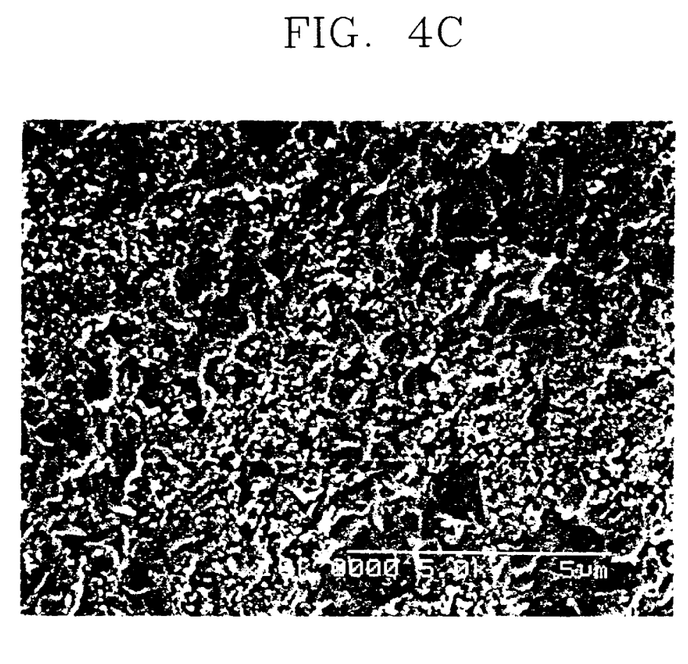
Figure 4D:
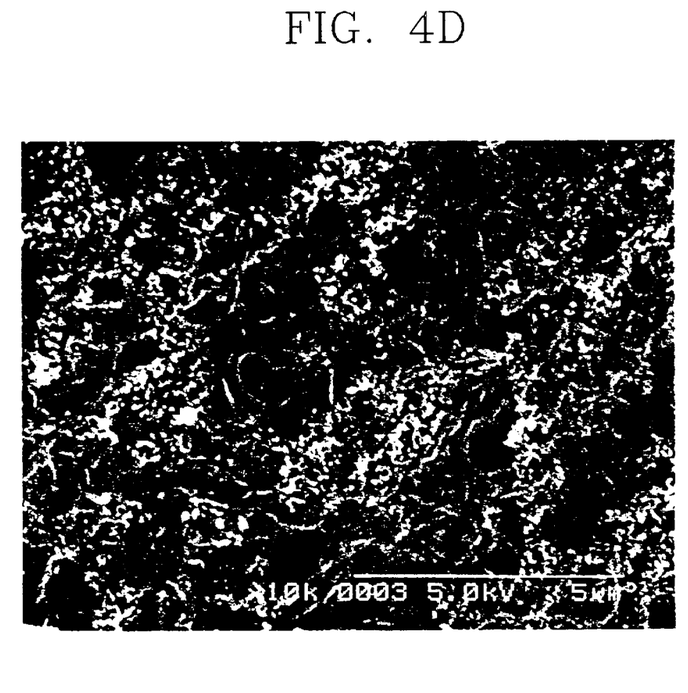

In other words, it can be indirectly appreciated that the separators shown in FIGS. 4C and 4D have nonuniform pores and small porosity compared to those shown in FIGS. 4A and 4B.

Figure 5:
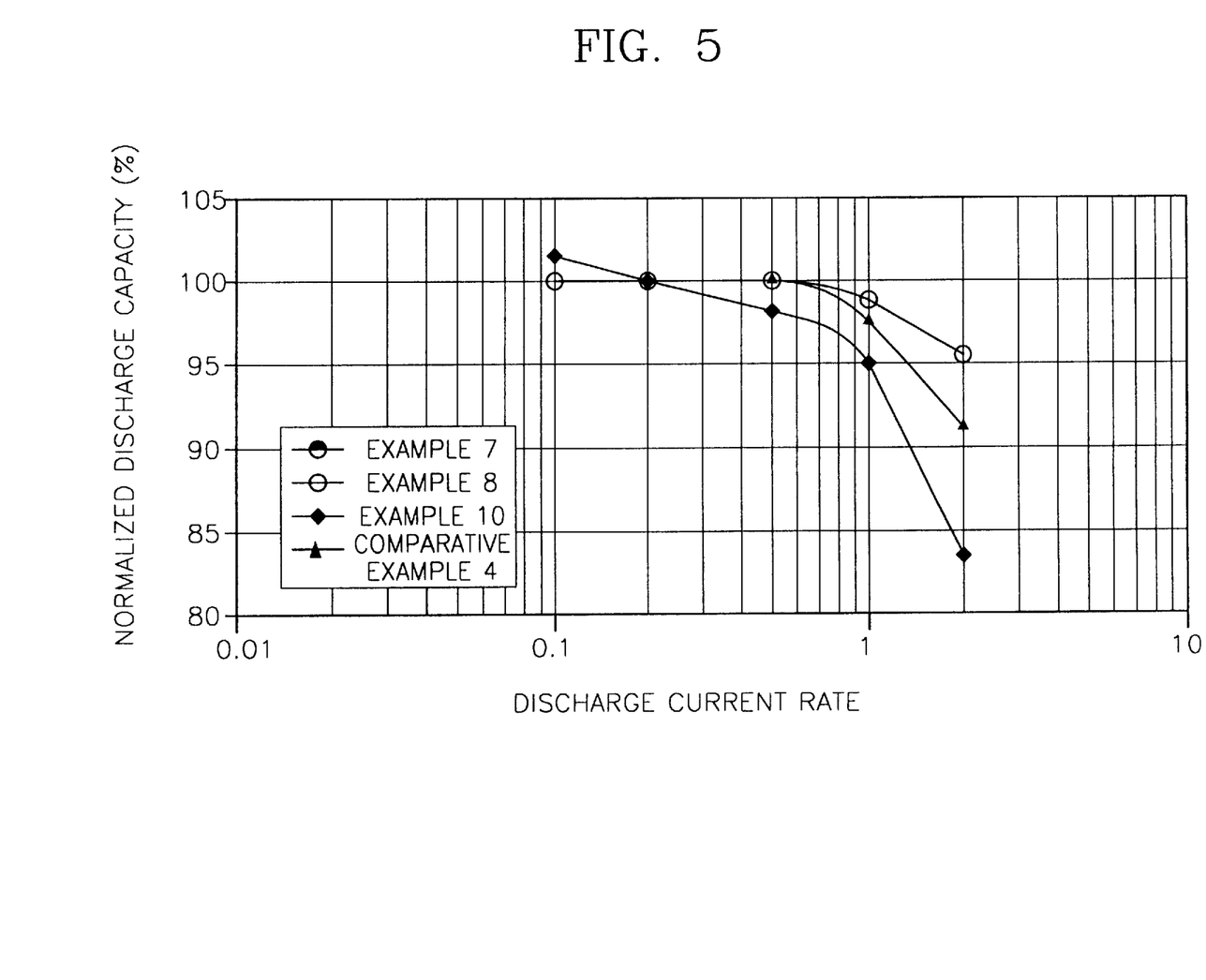
FIG. 5 illustrates changes in the normalized discharge capacity depending on the discharge current rate, in lithium secondary batteries prepared by Examples 7–8 and 10 of the present invention and Comparative Example 4.

In lithium secondary batteries prepared by Examples 7–8, Example 10 and Comparative Example 4, the normalized discharge capacity depending on the discharge current rate was examined and the result is shown in FIG. 5.

Referring to FIG. 5, it is confirmed that the lithium secondary batteries prepared by Examples 7–8 have better discharge capacity characteristics under a high-rate condition than those prepared by Example 10 and Comparative Example 4.

Figure 6:
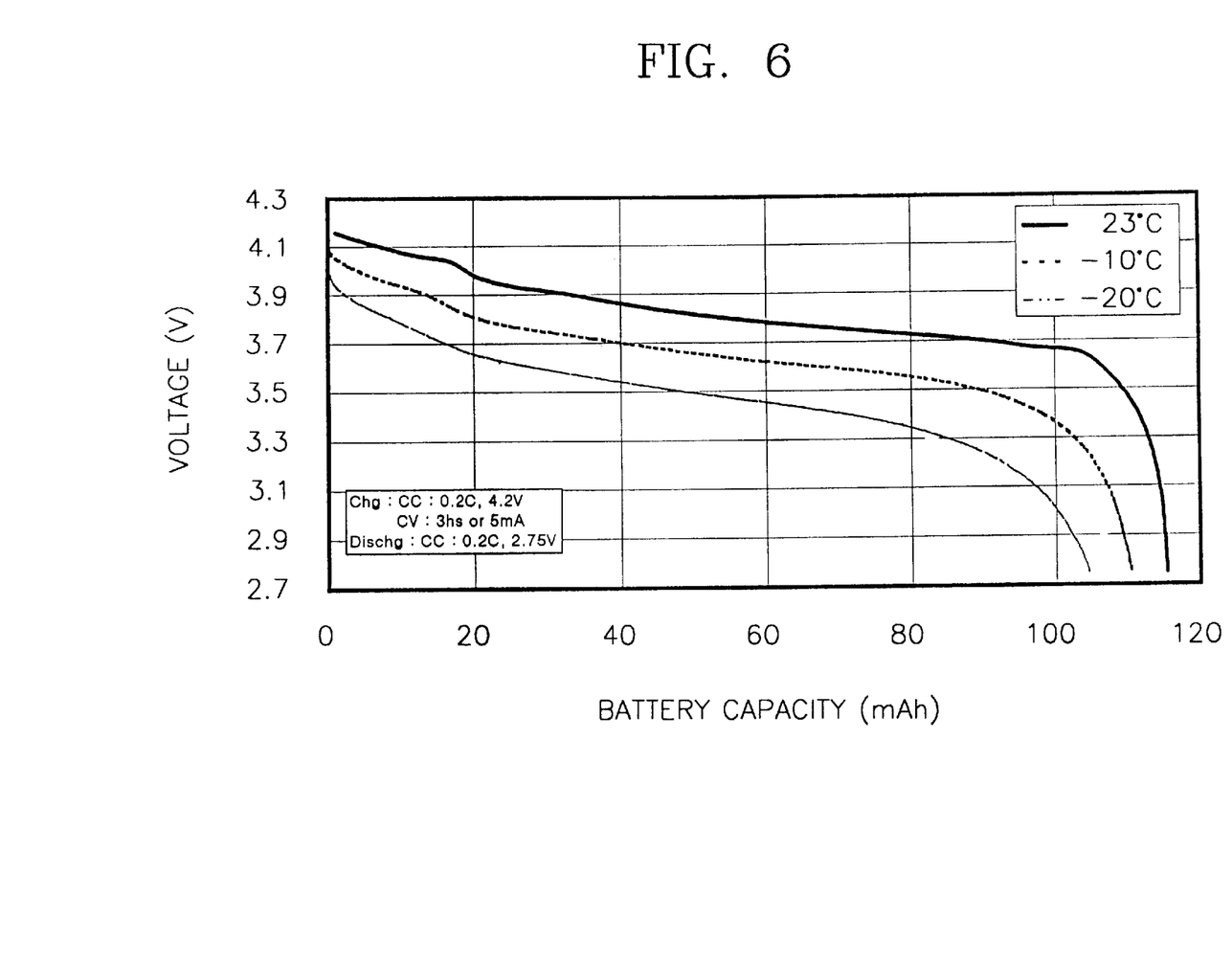
FIG. 6 illustrates a change in the voltage depending on the battery capacity at temperatures of 23° C., –10° C. and –20° C., in a lithium secondary battery prepared by Example 7 of the present invention.

In a lithium secondary battery prepared by Example 7 of the present invention, a change in the voltage depending on the battery capacity was examined at temperatures of 23° C., −10° C. and −20° C., and the result is shown in FIG. 6.

Referring to FIG. 6, it is confirmed that the lithium secondary battery prepared by Example 7 has excellent voltage characteristics depending on the capacity not only at room temperature but also at −10° C. and −20° C.

Figure 7:
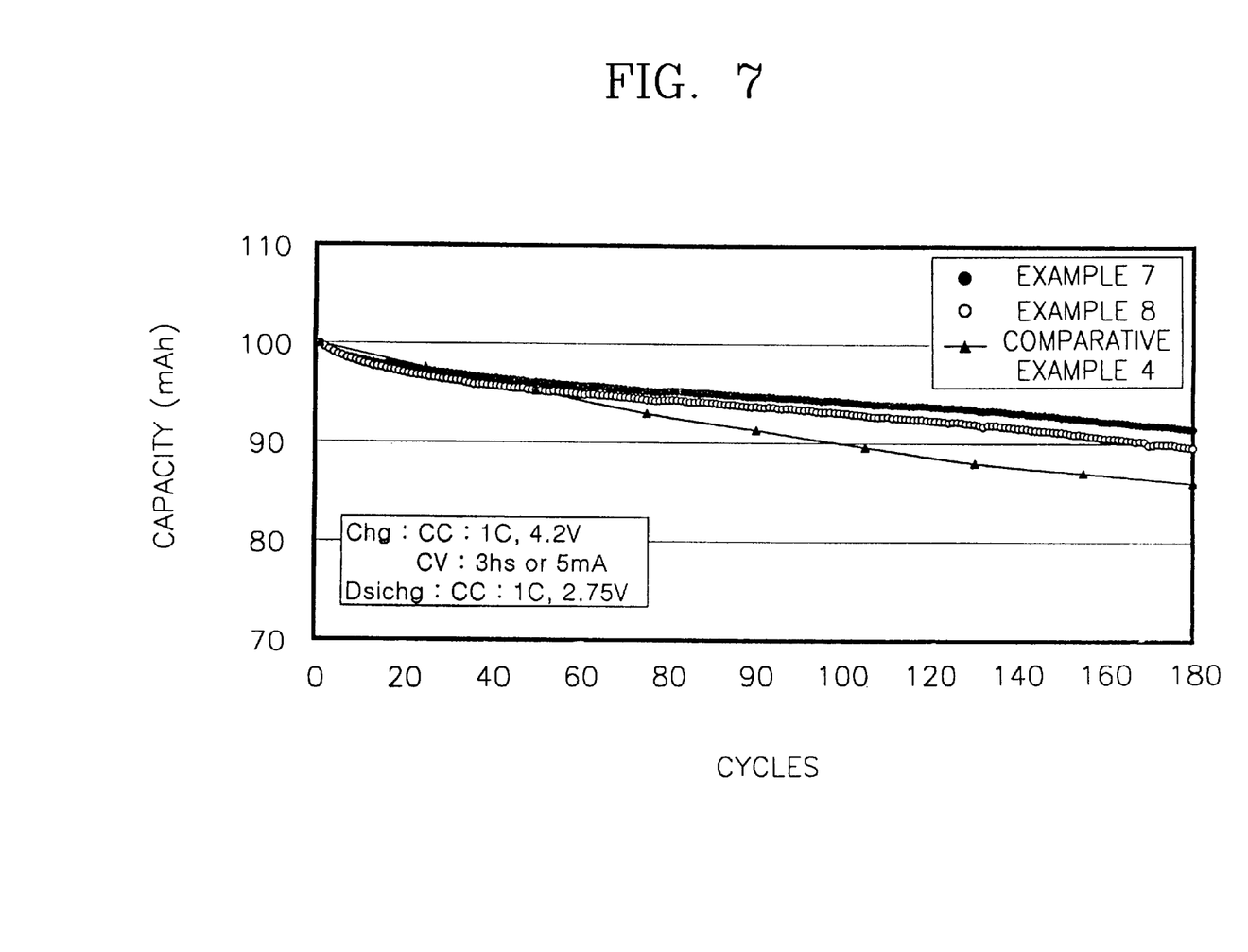
FIG. 7 illustrates a change in the discharge capacity depending the number of cycles in lithium secondary batteries prepared by Examples 7–8 of the present invention and Comparative example 4.

Next, lifetime characteristics of lithium secondary batteries prepared by Examples 7–8 and Comparative Example 4 were examined and the results thereof are shown in FIG. 7.

Referring to FIG. 7, the lithium secondary batteries prepared by Examples 7–8 show a decrease in the reduction of the capacity as the number of cycles increases.

According to the present invention, since a plasticizer can be removed under a vacuum condition, the time required for manufacturing a battery can be reduced and the manufacturing process becomes simplified, thereby improving the productivity. Also, since an organic solvent extraction process using an organic solvent is not necessary, unlike in the conventional art, the cost required for a recovery facility of an organic solvent can be reduced. Further, uniform pores are formed in electrodes and a separator, the porosity characteristics are excellent, and adhesion between the separator and the electrodes is excellent, thereby exhibiting excellent high-rate, lifetime, and low-temperature characteristics.

What is claimed is:

1. A composition for forming a separator of a lithium secondary battery, having a polymer resin, a plasticizer, a filler and a solvent, wherein the plasticizer has a flash point of 60° C. or below and is at least one material selected from the group consisting of propylene glycol methyl ether acetate, propylene glycol monomethyl ether and propylene glycol monoethyl ether.

2. The composition according to claim 1, wherein the polymer resin is polyvinylidenefluoride (PVdF), vinylidenefluoride-hexafluoropropylene copolymer in which the content of HFP is greater than 0 and less than 8% by weight (VdF-HFP copolymer A), a mixture of VdF-HFP copolymer A and PVdF, or a mixture of VdF-HFP copolymer A and VdF-HFP copolymer in which the content of HFP is greater than or equal to 8% by weight and less than or equal to 15% by weight (VdF-HFP copolymer B).

3. The composition according to claim 1, wherein the solvent is acetone.

4. A method for manufacturing a lithium secondary battery comprising the steps of:

(a) coating electrode active material compositions each comprising a electrode active material, a binder and a solvent on an electrode current collector to form a cathode and an anode;

(b) forming a separator on both surfaces of the anode using a composition for forming a separator comprising of a polymer resin, a plasticizer, a filler and a solvent;

(c) disposing and fixedly adhering the cathode on the separator to form a battery structure;

(d) drying the battery structure under a vacuum condition; and (e) impregnating an electrolytic solution into the resultant structure, wherein the plasticizer of the composition for forming the separator has a flash point of 60° C. or below and is at least one material selected from the group consisting of propylene glycol methyl ether acetate, propylene glycol monomethyl ether and propylene glycol monoethyl ether, and the drying of the step (d) is performed under the pressure of 760 to $10^{-3}$ Torr at a temperature of 20 to 60° C.

5. The method for manufacturing a lithium secondary battery according to claim 4, wherein the polymer resin is polyvinlidenefluoride (PVdF), vinylidenefluoride-hexafluoropropylene copolymer in which the content is HFP is greater than 0 and less than 8% by weight (VdF-HFP copolymer A), a mixture of VdF-HFP copolymer A and PVdF, or a mixture of VdF-HFP copolymer A and VdF-HFP copolymer in which the content of HFP is greate than or equal to 8% by weight and less than or equal to 15% by weight (VdF-HFP copolymer B).

6. The method for manufacturing a lithium secondary battery according to claim 4, wherein the solvent used in preparing the composition for forming a separator is acetone.

7. The method for manufacturing a lithium secondary battery according to claim 4, wherein the separator is formed by directly coating the separator forming composition on the anode and drying the resultant structure, or by casting the separator forming composition on a separate support, drying and peeling off the resultant structure.

8. The method for manufacturing a lithium secondary battery according to claim 4, wherein a conductive agent and/or a plasticizer are further added to the electrode active material forming composition.

9. The method for manufacturing a lithium secondary battery according to claim 8, wherein the plasticizer of the electrode active material forming composition is polyvinylidenefluoride (PVdF), vinylidenefluoride-hexafluoropropylene copolymer in which the content of HFP is greater than 0 and less than 8% by weight (VdF-HFP copolymer A), a mixture of VdF-HFP copolymer A and PVdF, or a mixture of VdF-HFP copolymer A and VdF-HFP copolymer in which the content of HFP is greater than 0 and less than or equal to 15% by weight (VdF-HFP copolymer B).

* * * * *